July 26, 1960 — L. E. HUNT ET AL — 2,946,972
WAVE GUIDE PHASE INVERTER
Filed Dec. 29, 1958 — 2 Sheets-Sheet 1
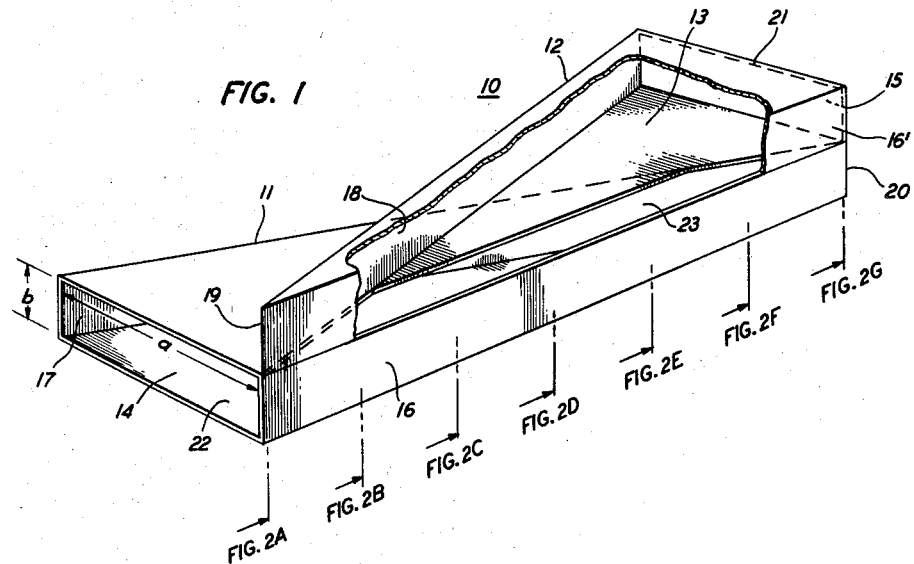
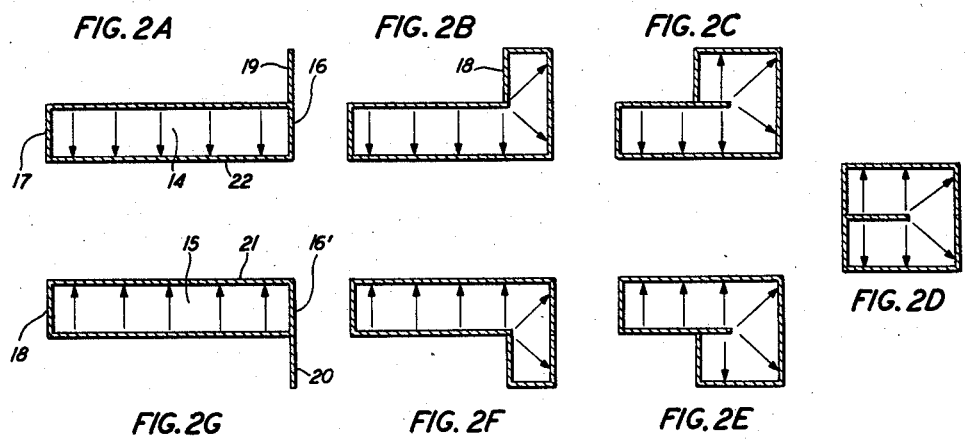
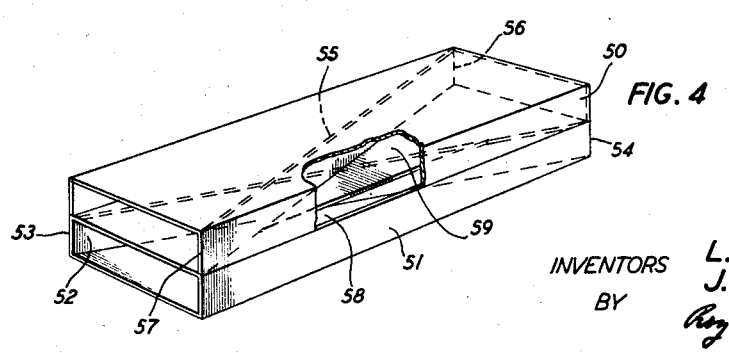
INVENTORS
L. E. HUNT
J. C. SCHELLENG
BY
ATTORNEY

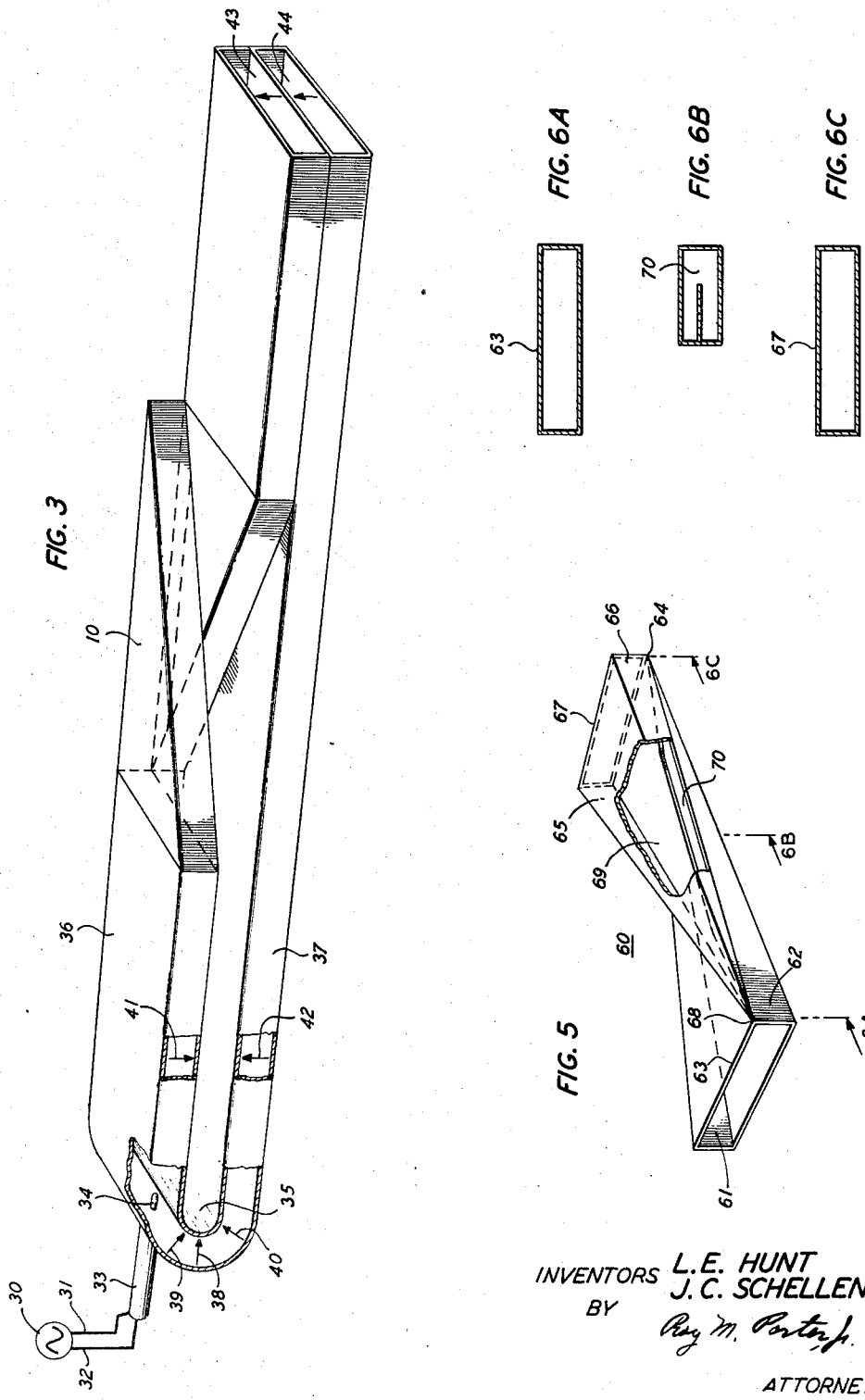
INVENTORS L.E. HUNT
J.C. SCHELLENG
BY
ATTORNEY

United States Patent Office 2,946,972
Patented July 26, 1960

2,946,972
WAVE GUIDE PHASE INVERTER

Loyd E. Hunt, Oakhurst, and John C. Schelleng, Asbury Park, N.J., assignors to Bell Telephone Laboratories, Incorporated, New York, N.Y., a corporation of New York Filed Dec. 29, 1958, Ser. No. 783,507

8 Claims. (Cl. 333—98)

This invention relates to transmission line coupling arrangements and, more particularly, to a phase inverter for electromagnetic waves adapted for use in such arrangements.

As disclosed in United States Patent 2,401,751 issued to Harold T. Friis on June 11, 1946, impedance matching over a band of frequencies between coaxial line and a main wave guide, together with unilateral wave propagation in the main wave guide, may be effected without the use of frequency dependent tuning stubs or reflectors by using a rectangular wave guide which is looped, or folded, in the plane of polarization of the electric field associated with the waves propagating therein so that its extremities are contiguous and the short transverse dimensions of the end apertures are aligned, thereby permitting coupling from both apertures to the main wave guide. For broadband multifrequency operation, the coaxial line input to the main wave guide is connected to the longitudinal center point of the looped wave guide and each of the two branches of the looped guide includes a 90-degree twisted wave guide section for introducing a phase shift to the propagating waves. This phase shift is necessary in order that the electric field vectors be of collinearly aligned polarizations of the proper polarity for addition in the two branches at their adjacent end apertures. Such a folded guide coupling arrangement is useful in many microwave systems, but the 90-degree twist sections are difficult to manufacture as well as cumbersome in installation. As disclosed in United States Patent 2,408,033, issued September 24, 1946 to A. C. Beck, the necessity for the 180-degree phase inversion may be eliminated by looping the rectangular wave guide in the plane of the magnetic field components of the propagating waves. However, such an arrangement, while obviating the need for wave guide twists, is often disadvantageous owing to the physically large space needed and for other reasons.

It is, therefore, an object of this invention to couple multifrequency wave energy between a coaxial line and a main wave guide, utilizing an intermediate E plane looped or folded wave guide section including a wave energy phase inverter which combines simplicity of construction with quality performance.

It is a further object of this invention to invert by novel means the phase of wave energy propagating in hollow pipe type wave guides.

It is a more specific object to invert the phase of wave energy propagating in a wave guide component consisting entirely of flat, straight, metallic strips.

In accordance with a preferred embodiment of the invention, two wave guides of rectangular transverse cross section are disposed to have a common broad wall which is cut away at one longitudinal edge. The broad walls of the two wave guides are linearly tapered in respectively opposite senses between full width and zero width along their longitudinal edge opposite the coupling slot. Since the tapers are of opposite sense, at one end of the inverter structure a first of the two wave guides is of full width and the second is of zero width while at the other end thereof, the first of the two wave guides is of zero width and the second is of full width. The pitches of the tapered sections are preferably equal, and, therefore, the cut-off dimension of the generally rectangular wave path through the inverter, as measured at a given transverse cross-section from one narrow wall through the cut away section of the common broad wall to the other narrow wall, will remain constant.

In the operation of the device, wave energy enters at one end of the inverter and, as the taper is encountered, the energy is squeezed through the coupling slot into the second guide. At any point along the inverter, the wave occupies both guides, the amount in each guide being determined by the width of that guide. The total width between the tapering sides remains constant. Thus, as the energy is squeezed out of the contracting space of one guide into the expanding space of the other guide, the electric vector associated with the waves rotates from the first guide over and through the apertured common dividing wall between the guides to the other guide, thereby reversing its polarity and effecting a 180-degree phase reversal.

One feature of the invention is its compactness. An energy coupling arrangement including the novel invention may be much shorter than prior art coupling arrangements in which a phase inversion was desired.

The above and other objects and features of the present invention, the nature of the invention, and its advantages will appear more fully upon consideration of the illustrative embodiments shown in the accompanying drawing and of the following detailed description of the drawing.

In the drawing:

Fig. 1 is a partially broken away perspective view of an inverter in accordance with the present invention;

Figs. 2A–2G are transverse cross-sectional views of the inverter shown in Fig. 1;

Fig. 3 is an energy coupling arrangement including an inverter of the type shown in Fig. 1;

Figs. 4 and 5 are alternate embodiments of the inverter structure; and

Figs. 6A–6C are transverse cross-sectional views of the inverter shown in Fig. 5.

Referring now more particularly to Fig. 1, a first wave guide 11 and a second wave guide 12 are joined together to form an electromagnetic wave energy phase inverter 10 in accordance with the present invention. The inverter 10 consists of a guiding path or wave guide 11 and a guiding path or wave guide 12 which share a common wall 13. The guide 11 is adapted at its terminal end 14 to connect to an ordinary wave guide of rectangular transverse cross section. The guide 12 is similarly adapted at its terminal end 15. The terminal apertures of the guides 11, 12 have a broad dimension $a$ and a narrow dimension $b$. The dimension $a$ determines the frequency below which the guide is no longer capable of supporting propagating wave energy and is commonly referred to as the cut-off dimension. For dominant mode operation, the dimension $a$ is generally selected to be less than one wavelength but greater than one-half wavelength associated with wave energy of the median frequency to be propagated in the guide. The dimension $b$ is generally selected to be less than one-half of the dimension $a$. In Fig. 1, the dimensions $a$ and $b$ associated with the terminal apertures of the guides 11, 12 are in the approximate ratio of 5:1.

Each of guides 11, 12 has one narrow wall, designated in Fig. 1 as 16, 16', which extends longitudinally parallel to the direction of energy transmission through the inverter. Guides 11, 12 are oriented with respect to each other such that narrow walls 16, 16' are transversely adjacent and coplanar. Narrow wall 17 of guide 11 and narrow wall 18 of guide 12 are angularly related to the direction of energy transmission through the inverter. Thus, narrow walls 16', 18 meet at intersection 19, while narrow walls 16, 17 meet at intersection 20. As one proceeds from one end of the inverter to the other, intersections 19, 20 are located at opposite ends. Stated differently, the narrow walls 17, 18 are angularly related to the energy transmission direction in opposite senses; i.e., their slopes are oppositely sensed.

Intersecting narrow walls 16', 18 are connected by triangular wall 21 on one side and by common wall 13 on the other side. Likewise, intersecting narrow walls 16, 17 are connected by triangular wall 22 on one side and by common wall 13 on the other side. Each of the guiding paths thus have triangular longitudinal cross sections and rectangular transverse cross sections. The triangular longitudinal cross sectional area of each of the guiding paths is the same at any longitudinal section plane; the rectangular transverse cross sectional area of each of the guiding paths varies from one transverse section plane to another due to the tapered wall structure.

Extending longitudinally along the edge of wall 13 which is common at all points to both guides is a slot 23. The slot 23 provides the means by which energy propagating in one of the guiding paths 11, 12 is transferred to the other of the guiding paths. Slot 23 has a width along its major portion preferably equal to the dimension $b$ associated with guides 11, 12. The slot is necessarily tapered at its ends to conform to the area between intersecting narrow walls 16, 17 and 16', 18.

The slopes associated with the taper of triangular walls 21, 22 are, as mentioned hereinbefore, of opposite sense. In addition, it is preferable that the slopes be equal in magnitude. Thus guiding paths 11, 12 may be said to be congruent; i.e. identical and, if oriented properly, superposable. By virtue of the equality of magnitude and oppositeness of sense of the tapers associated with paths 11, 12, the wider, or cut off, dimension associated with any given transverse cross section of inverter 10 is of a substantially constant value anywhere along the longitudinal extent of the structure. That is to say, the distance between the walls 17, 18 as measured from one of said walls to and through the slot 23 to the other of said walls is everywhere the same. Therefore, an inverter in accordance with the present invention is an essentially constant cut-off device. Likewise, it is desirable in many applications that an inverter be also a constant impedance device. Since the width of the slot 23 and the dimension $b$ associated with the guiding paths 11, 12 are equal, the guiding path dimension which is perpendicular to the cut-off dimension and which is parallel to the electric vector associated with a dominant mode electromagnetic wave propagating through the inverter remains substantially constant. The impedance level of the inverter, therefore, also is substantially constant.

In the operation of the phase inverter shown in Fig. 1, linearly polarized electromagnetic wave energy is applied to one or the other of terminal ends 14, 15. In this specification, and for purposes of explanation only, it will be assumed that energy enters at terminal end 14 and exits at terminal end 15. The successive transverse cross sectional views of the inverter of Fig. 1, as shown in Figs. 2A–2G will be helpful in visualizing the phase inverting action. Fig. 2A is a transverse cross sectional view of inverter 10 at terminal end 14. It is assumed that, at the instant of initial observation, the electric vector associated with the linearly polarized wave has a downwardly directed sense as illustrated by the arrows in Fig. 2A which point toward wall 22. An instant after the initial observation, the initially observed wave has progressed into the inverter and has encountered the narrow wall 17 which is angularly related to the propagation direction and which restricts the wide dimension of guide 11. At the same time, however, the slot 23 is encountered, and a portion of guide 12 is exposed as part of a propagation path for the energy. A portion of the energy in narrowing guide 11 passes over to guide 12 through slot 23. As may be seen from Fig. 2B, the cut-off dimension as measured between walls 17, 18 remains the same as that in Fig. 2A as measured between walls 17, 16. As the energy progresses still further into inverter 10, the energy is "squeezed" out of guide 11 by the restricting narrow wall 17 into the expanding space of guide 12. At any point along the inverter, the wave energy occupies both guides, the amount on each side being determined by the guide width on that side. As the wave passes from guide 11 into guide 12 the tip of the electric vector rotates from triangular wall 22, around the common wall 13, to triangular wall 21. This rotation imparts a phase change of 180 degrees, or inversion, to energy which entered guide 11. Figs. 2C–2F are additional transverse cross sectional views illustrating the phase inversion. In Fig. 2G, the terminal end 15 of guide 12 is shown in transverse cross section. The electric vector associated with the linearly polarized wave has an upwardly directed sense as illustrated by the arrows which point toward wall 21. Since the wave represented by the arrows in Fig. 2G is assumed to be the same wave as was initially observed entering terminal end 14 in Fig. 2A with a sense of polarization exactly opposite from that of the exiting wave, inverter action has been achieved.

Fig. 3 illustrates the use of the inverter of Fig. 1 in an energy coupling arrangement. Source 30 supplies energy via the conductors 31, 32 to coaxial line 33. Center conductor 34 of coaxial line 33 extends through and is suitably insulated from the wall of guide 35. Center conductor 34, when energized by source 30, initiates linearly polarized traveling electromagnetic waves in both branches 36, 37 of guide 35. The guide 35 is bent, or looped in the E plane of the energy propagating therein. From the directional sense of polarization of the excited waves as represented by arrows 38—42, it may be seen that the waves in branch 36, represented by arrow 41, are oppositely sensed from the waves in branch 37, represented by arrow 42. If maximum coupling of energy from coaxial line 33 is desired, the energy in branches 36, 37 must be added. In order to accomplish this result, a phase inversion in one branch is necessary, and to perform the phase inversion, inverter 10 is inserted in branch 36. According to the description of inverter 10 which appeared hereinabove, linearly polarized wave energy entering inverter 10 with a given sense of polarization will suffer a 180-degree phase shift within the inverter and will exit therefrom with a sense of polarization exactly opposite from that of the entering energy. In Fig. 3, the phase inversion serves to permit direct addition of the energy appearing at aligned end apertures 43, 44 of branches 36, 37, respectively. These branches may then be joined to a single main wave guide. Thus, energy from coaxial line 33 will be substantially completely transferred without loss or reflection to a main wave guide and will propagate unilaterally in the latter. The phase inversion is not dependent on critical dimensions which are themselves functions of the wavelength of the propagating energy and, therefore, the inversion is substantially independent of frequency. Furthermore, assuming no inherent mismatch between the coaxial line and the main wave guide, the energy transferal between the coaxial line and the main wave guide is likewise substantially independent of frequency. Also, the inversion has been accomplished without the use of either loading elements having variable indices of refraction or twisted wave guide sections.

Figs. 4 and 5 represent additional structural embodiments of inverters in accordance with the present invention.

In Fig. 4, the inverter comprises two rectangular wave guides 50, 51 of constant rectangular transverse cross section along their longitudinal extent which share a common broad wall. A septum 52 extends within guide 51 and gradually narrows the cut-off dimension associated with guide 51. Septum 52 meets the narrow walls of guide 51 at diagonally opposite intersections 53, 54. Likewise, septum 55 extends within guide 50 and gradually narrows the cut-off dimension associated with guide 50 in an opposite sense from that associated with septum 52 in guide 51. Septum 55 meets the narrow walls of guide 50 at diagonally opposite intersections 56, 57. A slot 58 is provided in the broad wall 59 common to guides 50, 51 through which the energy from one guide may pass over into the other guide. The operation of the inverter is substantially similar to that described above with specific reference to Fig. 1.

The inverter construction illustrated in Fig. 4 offers the advantage of easy assembly from standard component wave guide parts which need be only slightly modified. In addition, the possibility arises of dual channel inverter action by providing a second coupling slot along the portion of the common wall 59 opposite slot 58. In such a dual arrangement, for example, waves could enter guide 50 simultaneously at both ends of the inverter, the entering waves being confined in separate inversion paths by septa 55, 52. No problem of interference would arise since the skin depth associated with the wall currents is less than the wall thickness.

Fig. 5 illustrates a still further embodiment of the invention. The inverter 60 of Fig. 5 is similar in many respects to that of Fig. 1. However, the two tapered guiding paths are characterized by tapering height as well as tapering width. Thus, narrow walls 61, 62 associated with guide 63 are triangular in shape, and meet at apex 64. Narrow walls 65, 66 associated with guide 67 are likewise triangular in shape and meet at apex 68. The common broad wall 69 between the two guides is provided with a slot 70 to enable energy transfer between the guides. Figs. 6A–6C are transverse cross sectional views of the inverter of Fig. 5 taken, respectively, at one end, at the center, and the other end thereof. It may be seen that, while the cut-off dimension associated with the propagation path through the inverter remains constant, the dimension more closely associated with the determination of impedance level varies. Thus, the inverter shown in Fig. 5 is characterized by an impedance level which varies from one transverse cross section to another. However, the impedance level at the two ends of the inverter is the same and, therefore, if the taper associated with narrow walls 61, 62, 64, 65 is gradual, the transformation in impedance level will be slow as the energy progresses through the device and reflections will be minimized.

The inverter of Fig. 5 offers the advantage of maintaining a constant total height dimension over its entire length. This height is the same as that of the input and output waveguides and therefore an installation including the inverter of Fig. 5 would be free from double height guide portions.

In all cases, it is to be understood that the above-described arrangements are illustrative of some of the possible specific embodiments which can represent applications of the principles of the invention. Numerous and varied other arrangements can readily be devised in accordance with these principles by those skilled in the art without departing from the spirit and scope of the invention.

What is claimed is:

1. In combination, first and second wave transmission paths each having one dimension inversely proportional to the cut-off frequency associated therewith, and means located in a coextensive portion of said paths for transferring electromagnetic wave energy therebetween, said dimension of said first path along the region of said coextensive portion in which said transferring means are located varying between a finite value at a first end of said region and a value less than cut-off at the other end of said region, and said dimension of said second path along the region of said coextensive portion in which said transferring means are located varying between a value less than cut-off at said first end and said finite value at said other end whereby energy entering one end of said wave paths is constrained by the diminishing dimension thereof to pass via said transferring means into said other wave path with a resultant phase inversion.

2. In combination, a first wave guide of rectangular transverse cross section having pairs of broad and narrow walls and first and second terminal ends, a second wave guide of rectangular transverse cross section having pairs of broad and narrow walls and first and second terminal ends, said first wave guide and said second wave guide having one broad wall of said pairs of broad walls in common, a coupling slot for electromagnetic wave energy extending along one edge of said common wall, and conductive means effectively tapering the transverse extent of said broad walls between a given full width at one of said terminal ends and zero at the other of said terminal ends with the terminal ends of said given full width being at respectively opposite ends of said first and second wave guides.

3. The combination according to claim 2 in which said wave guides are of triangular longitudinal cross section and said conductive means comprise said narrow walls.

4. The combination according to claim 2 in which said wave guides are of rectangular longitudinal cross section and said conductive means comprise septa extending one each within said guides between diagonally opposite corners of said terminal ends.

5. A microwave phase inverter comprising a first wave guide of rectangular transverse cross section with a pair of intersecting walls of constant dimension and a pair of parallel walls which vary smoothly in dimension from a given value at one end thereof to zero at the other end thereof, a second wave guide of rectangular transverse cross section with a pair of intersecting walls of constant dimension and a pair of parallel walls which vary smoothly in dimension from a given value at one end thereof to zero at the other end thereof, said first and second wave guides having one wall of said pairs of parallel walls in common, and means for coupling wave energy between said guides along one edge of said common wall, said wave guides being disposed relative to each other such that the parallel wall portions of zero dimension of said first and second wave guides are at opposite terminal ends of said inverter.

6. A wave energy phase inverter comprising a first conductively bounded wave transmission path characterized by a diminishing rectangular transverse cross sectional area as said path is traversed in a given direction, a second conductively bounded wave transmission path characterized by an increasing rectangular transverse cross sectional area as said path is traversed in said given direction, said paths being coextensive and sharing at least one common wall, and an aperture in said common wall extending in said given direction through which electromagnetic wave energy entering either of said paths may pass with a resultant 180 degree phase shift.

7. The inverter according to claim 6 in which said diminishing and said increasing rectangular transverse cross sectional areas are each characterized by at least one dimension which remains constant from one transverse cross section to another.

8. The inverter according to claim 6 in which said diminishing and said increasing rectangular transverse cross sectional areas are each characterized by dimensions all of which vary from one transverse cross section to another.

References Cited in the file of this patent
UNITED STATES PATENTS
2,848,690  Miller _____ Aug. 19, 1953